(12) United States Patent
Rasekh et al.

(10) Patent No.: US 11,750,568 B1
(45) Date of Patent: Sep. 5, 2023

(54) SECURE PROXY SERVICE

(71) Applicant: Amazon Technologies, Inc., Seattle, WA (US)

(72) Inventors: Oren Meron Rasekh, Silver Spring, MD (US); Christian Joseph Johnson, Silver Spring, MD (US); Anton S Dahbura, Centreville, VA (US); Gary Alan Huber, Arlington, VA (US)

(73) Assignee: Amazon Technologies, Inc., Seattle, WA (US)

( * ) Notice: Subject to any disclaimer, the term of this patent is extended or adjusted under 35 U.S.C. 154(b) by 128 days.

(21) Appl. No.: 17/467,781

(22) Filed: Sep. 7, 2021

(51) Int. Cl.
*H04L 9/40* (2022.01)
*H04L 67/10* (2022.01)
*H04L 67/56* (2022.01)

(52) U.S. Cl.
CPC ........ *H04L 63/0281* (2013.01); *H04L 63/101* (2013.01); *H04L 63/205* (2013.01); *H04L 67/10* (2013.01); *H04L 67/56* (2022.05); *H04L 63/166* (2013.01)

(58) Field of Classification Search
None
See application file for complete search history.

(56) References Cited

U.S. PATENT DOCUMENTS

| | | | |
|---|---|---|---|
| 10,999,325 B1* | 5/2021 | Chandana | G06F 21/50 |
| 2010/0146290 A1* | 6/2010 | Bachmann | H04L 63/0823 713/185 |
| 2012/0042042 A1* | 2/2012 | Winkler | H04L 63/102 709/217 |
| 2018/0131699 A1* | 5/2018 | Park | H04L 63/0281 |
| 2021/0110282 A1* | 4/2021 | McCann | H04L 63/1416 |

\* cited by examiner

*Primary Examiner* — Quang N Nguyen
(74) *Attorney, Agent, or Firm* — Kilpatrick Townsend & Stockton LLP

(57) ABSTRACT

Cross domain resource access includes accessing resources in a first domain from a second domain. This may be performed using the methods, system, and devices described herein. This may include maintaining a mapping identifier for a user of a service provider based on user information. The service provider may provide first and second security domains for the user. The mapping identifier may be associated with an endpoint of a private cloud computing service of the first security domain. The may also include receiving, from the first security domain, a request associated with a resource of the second security domain, the request comprising the mapping identifier. This may also include routing the request from the first security domain to the second domain via a first private network link of the first security domain and a second private network link of the second security domain using a confidentiality controlled interface.

20 Claims, 10 Drawing Sheets

SECURE PROXY SERVICE

BACKGROUND

A service provider may provide a cloud computing system that enables users to configure domains based on different security levels. For example, a first domain may be configured to store highly confidential data, while a second domain may be configured to store non-confidential data. Additionally, each domain may include its own applications and services, which may include user-specific applications and services and/or generic applications and services provider by the service provider. Given the guardrails in place between the domains, accessing data, applications, and services in one domain from another may prove challenging.

BRIEF DESCRIPTION OF THE DRAWINGS

Various examples in accordance with the present disclosure will be described with reference to the drawings, in which.

DETAILED DESCRIPTION

Figure 1:
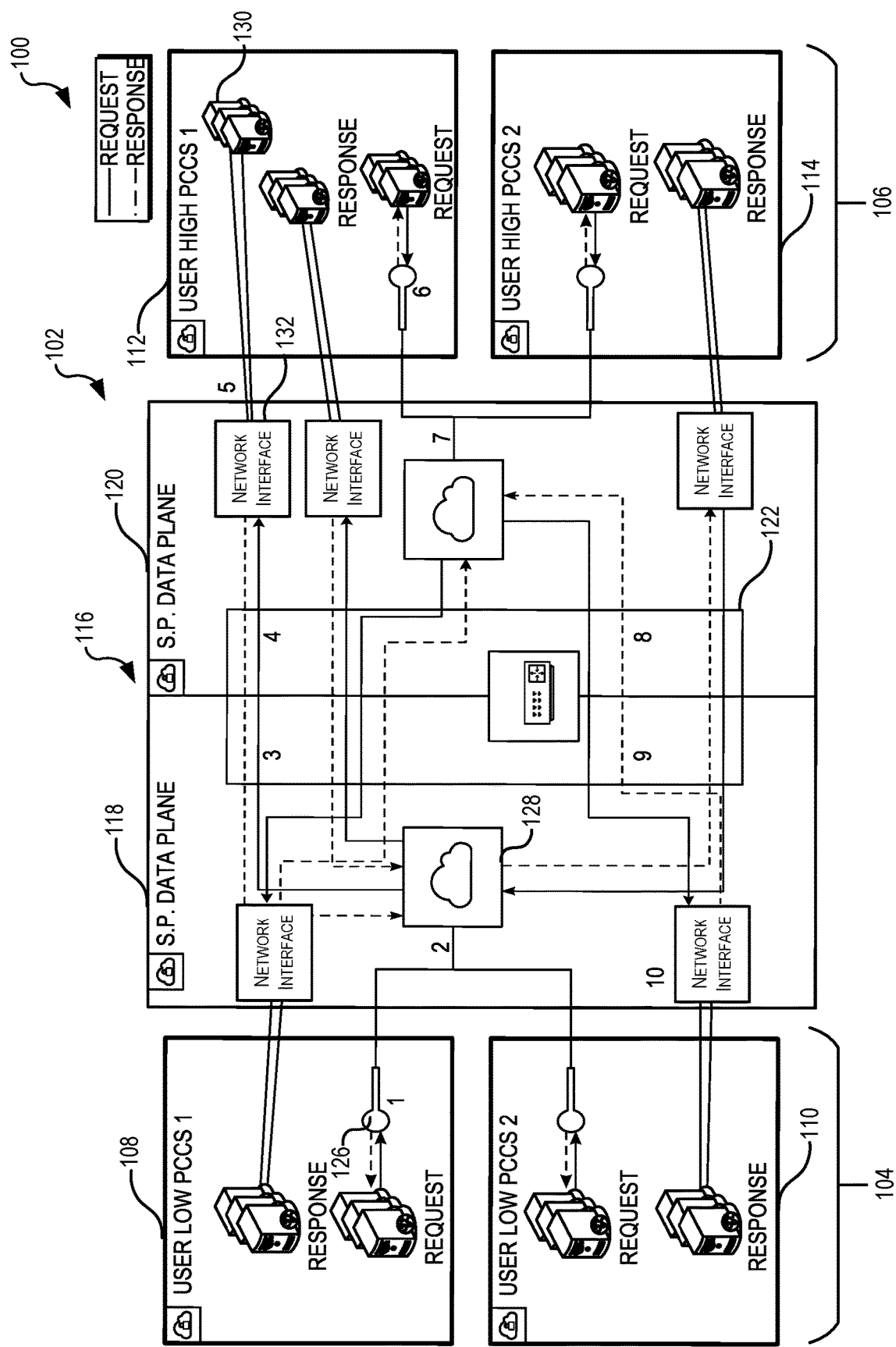
FIG. 1 illustrates an architecture for implementing techniques relating to low latency cross-domain resource access, according to at least one example.

Examples described herein are generally directed to a cross-domain resource access system and techniques of utilizing the cross-domain resource access system to access resources of first domain from a second domain. The cross-domain resource access system may be implemented in a cloud computing environment hosted by a service provider. For example, the service provider may provide a service by which users can set up their own virtual private computers (VPCs) and other cloud-based resources in their own private cloud computing service (PCCS). The PCCS may enable a user to launch resources in a logically isolated user-defined virtual network. In some examples, the PCCS may be selected from a pool of shared implementation resources located within a public cloud environment with certain levels of isolation between users, may be selected from a pool of implementation resources that are dedicated entirely to the user, or may be formed from some combination of shared and dedicated implementation resources.

Additionally, the service provider may enable users to define different domains within the same PCCSs and/or within different PCCSs. For example, depending on the level of isolation between implementation resources and other security features (e.g., ingress and egress points, encryption, firewalls, etc.), a user (e.g., a government entity or other user) may define a higher classified domain including higher classified data and resources and a lower classified domain including data and resources that are less classified than those in the higher classified domain. While these domains may be associated with the same user (e.g., owned and managed by a single entity), considering the hardware, software, and other security features in place between the two, it may be difficult for the user to access resources in one domain from the other and vice versa. The system and techniques described herein address this difficulty by providing a cross-domain resource access system with specific functionality to proxy requests and responses across domains. In particular, the cross-domain resource access system may provide an asynchronous request/response model between resources (e.g., applications and services) cross-domain from both low-to-high (L2H) (e.g., unclassified/low classified to classified/higher classified) and high-to-low (H2L) regions (e.g., classified/high classified to unclassified/lower classified). The cross-domain resource access system may be implemented using Hypertext Transfer Protocol (HTTP) and in a manner that maintains high-levels of privacy and security. For example, cross-domain communications may be proxied by the cross-domain resource access system across trusted private networks such as those operated by the service provider and without traversing public networks such as the Internet.

Turning now to a particular example, a service provider may allow a user to define multiple different security domains within a cloud computing environment. A first domain may be a low classification, including resources and data that are not classified. A second domain may be a higher classification, including resources and data that are classified. The user may have a need to access a resource in the second domain from a resource located within the first domain. To do so, the user may go through a short onboarding workflow provided by a service of the cloud computing environment. During the onboarding workflow, information about the user's resources is collected in order set up a routing policy for the user's anticipated access. The policy may identify which resource may be accessed, what content can pass between domains, and the like. The onboarding workflow also generates a mapping identifier, which represents a trust relationship between the first and second domain.. As described in more detail herein, the mapping identifier may be generated via a series of communication exchanges between the entities of the system to define the trusted relationship between the first and second domain (e.g., operators in the first and second domains and the service provider). The mapping identifier may include a unique identifier such as a unique string or other unique identifier, e.g., 6aa5455a-be47-45bd-b3e4-b21b8fe8a0f8. The mapping identifier may be used when making resource requests. For example, the user may, from the first security domain, issue a request to the service provider for accessing of a resource in the second domain. The request may include the mapping identifier in the request. The service provider may read the mapping identifier and determine how to route the request. This may include picking an appropriate guarding device for the routing and a routing policy to be applied by the guarding device as it relates to the mapping identifier. The mapping identifier may also be used to identify an endpoint associated with the resource in the second security domain. The service provider may proxy the request to the second security domain entirely on private network(s) of the service provider, rather than putting the request on a public network such as the Internet. The service provider may also perform a similar operation with responses to the request(s) coming from the second security domain directed to the first security domain. Thus, the service provider enables cross-domain resource access in a manner that preserves security of the domains.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the example being described.

Turning now to the figures, FIG. 1 illustrates an architecture 100 including a cross-domain resource access system 102 for implementing techniques relating to low latency cross-domain resource access, according to at least one example. The architecture 100 is depicted at a high level. Later figures will be used to describe different elements of the architecture 100 and the corresponding cross-domain resource access system 102 in greater detail. The architecture 100 includes the cross-domain resource access system 102, a user first domain 104, and a user second domain 106. In the illustrated example, the user first domain 104 is referred to as a "low" domain and the user second domain 106 is referred to as a "high" domain. Thus, in at least this example, resources in the user first domain 104 may be relatively less confidential than those in the user second domain 106. It should be understood that the architecture 100 and the cross-domain resource access system 102 may be used for resource access between domains having any suitable difference in security/classification. Additionally, while only two domains are illustrated (e.g., the user first domain 104 and the user second domain 106), it should be understood that cross-domain resource access system 102 may be used to implement cross-domain resource access by and between two or more domains (e.g., three domains, five domains, ten domains, twenty domains, one hundred domains, etc.).

As illustrated in FIG. 1, the user first domain 104 includes two PCCSs 108 and 110. The PCCS 108 may represent a user first PCCS in the user first domain 104. The PCCS 110 may represent a user second PCCS in the user first domain 104. Similarly, the user second domain 106 includes two PCCSs 112 and 114, representing a first and second PCCS in the user second domain 106. As illustrated, the cross-domain resource access system 102 may be used to enable access between and among PCCSs within the same domain, e.g., the PCCSs 108 and 110 in the user first domain 104 and the PCCSs 112 and 114 in the user second domain 106. Each user domain 104 and 106 may include one PCCS, two PCCSs (as illustrated), or any other suitable number of PCCSs that is more than two (e.g., three, five, ten, twenty, one hundred, etc.).

The cross-domain resource access system 102 also includes a service provider data plane 116. As illustrated in later figures, the service provider data plane 116 may include first service provider data plane 118 and a second service provider data plane 120. The first service provider data plane PCCS may be associated with the low side of the architecture 100. The second service provider data plane 120 may be associated with the high side of the architecture 100. The cross-domain resource access system 102 also includes a cross-domain resource access service 122 that is logically located within the service provider data plane 116.

FIG. 1 depicts example requests and responses, illustrated, respectively by solid lines and dashed lines. Numerals (1) through (5) represent an example put-up request and response (e.g., a request originating from a lower classified domain and response received from a higher domain). In particular, the request may begin at (1), within the PCCS 108 (of the user first domain 104). For example, the user may use the cross-domain resource access system 102 to issue a request from a resource of the PCCS 108 via an endpoint 126 (e.g., an egress point) of the PCCS 108. At (2), the request may be routed from the endpoint 126 to a private network link 128 of the first service provider data plane 118. From here, the request 124 may be routed into the cross-domain resource access service at (3) and out of the cross-domain resource access service 122 at (4). The cross-domain resource access service 122 may include confidentiality controlled interfaces, domain name service records, and/or other hardware and software to enable routing of the request to the appropriate resource in the user second domain 106. In particular, at (5), the request may be received by a network interface 132, which may be a virtual interface provided by a virtual computing instance associated with the network interface (e.g., an elastic network interface) of the second service provider data plan 120. This may enable the network interface 132 of the cross-domain resource access system 102 to access virtual computing resource 130 in the user second domain 106. Numerals (6) through (10) represent an example browse-down request and response (e.g., a request originating from a higher classified domain and response received from a lower domain). The browse-down request is processed by the system in a similar way as the put-up request.

Figure 2:
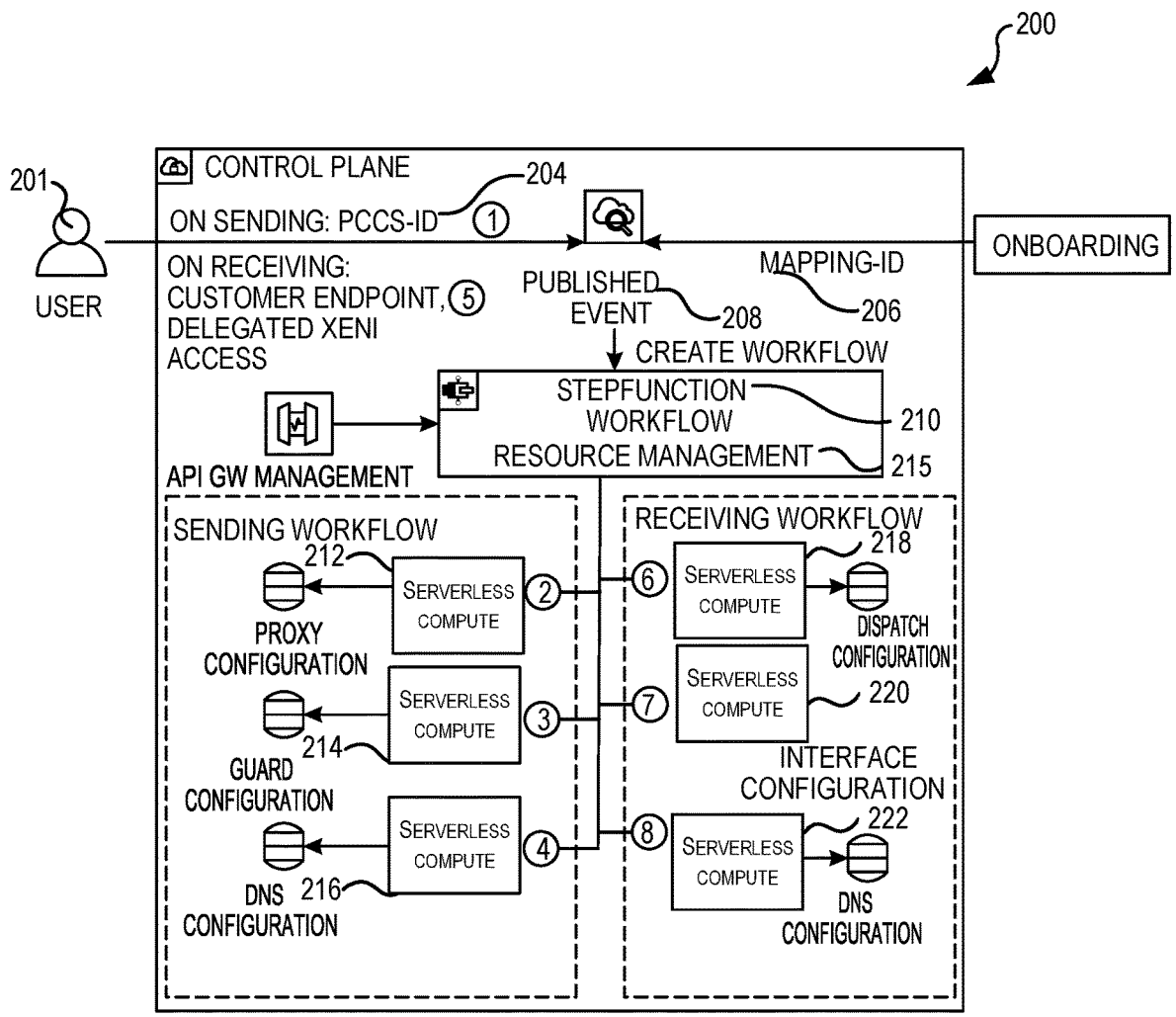
FIG. 2 illustrates an example control plane of a cross-domain resource access system, according to at least one example.

FIG. 2 illustrates an example control plane 202 of the cross-domain resource access system 102, according to at least one example. Generally, the control plane 202 may be configured to provision and manage the service provider data plane 116, introduced previously, that is used to instantiate an end-to-end data pathway for a user's messages to be proxied cross-domain via the private network links, as described herein. For example, the control plane 202 may be configured to establish a relationship between an identifier of an endpoint of a user's sending PCCS and a mapping identifier. The control plane 202 may also be configured to manage internal domain name service (DNS) configuration to enable the service provider data plane 116 to route user requests from the user's sending PCCS to the receiving PCCS using DNS records. The control plane 202 may also be configured to setup and manage delivery interfaces (e.g., elastic network interfaces, or other suitable delivery interfaces) and permissions required for the cross-domain resource access system 102 to proxy requests (e.g., such as HTTP requests) to user applications in the receiving PCCSs. The control plane 202 may also be configured to manage confidentiality controlled interfacec configurations, and relate user mapping identifiers to a set of allowable confidentially controlled interface devices to utilize for a given request. The control plane 202 may also be configured to conduct health and monitoring, which may include providing user metrics and pro-active alarming on potential loss of connectivity to user defined resources.

The control plane 202 may be configured to store data that was generated or otherwise obtained using an onboarding workflow. For example, the onboarding workflow may be used to generate data elements based on user information and other cross-domain resource access system 102 specific information. The data elements may be stored at various locations (e.g., within caches) of the cross-domain resource access system 102 in order to be accessible by elements of the cross-domain resource access system 102 during routing of requests and responses relating to cross-domain resource access events.

FIG. 2 illustrates a set of configuration operations, depicted as numerals (1)-(4), performed by the control plane 200 as part of onboarding a new user for sending. Sending and receiving actions are illustrated in FIG. 1. For sending, at (1), a user 201 provides the cross-domain resource access system 102 a unique PCCS endpoint identifier 204. The cross-domain resource access system 102 then issues a universally unique identifier (UUID) that represents a mapping identifier 206, which may include any unique string or other unique identifier, e.g., 6aa5455a-be47-45bd-b3e4-b21b8fe8a0f8, and publishes both the unique PCCS endpoint identifier 204 and the mapping identifier 206 as a published event 208 (e.g., using a service that enables near real-time stream of system events that describe changes in service provider resources). The published event 208 then triggers a step function workflow 210, e.g., (2)-(4).

The mapping identifier 206 may be entirely unique with respect to other mapping identifiers 206 and may be used to define a trust relationship for routing requests. The cross-domain resource access system 102 may send a mapping request from a first security domain (e.g., high side) to a second security domain (e.g., low side). The mapping request may indicate the mapping identifier and an account number of the second security domain (e.g., low side account identifier). With this information (e.g., the mapping identifier and the account number), the cross-domain resource access system 102 generates a pin that is communicated out of band between a high-side operator and low-side operator. For example, the pin may be communicated via a phone call, via email, via text message, and in any other suitable out-of-band method. The low side operator may take the pin and mapping request and use the cross-domain resource access system 102 to validate that the pin is valid and successful. At this point, the low-side may send a message back to the high-side indicating that the mapping has been successful. This may establish the trust relationship. The trust relationship may define that the high side is knowing of the high-side account identifier and the low-side account identifier by comparing against the mapping identifier. As part of the trust relationship, the high-side account identifier is not known to the low side entity, but low-side entity knows that it has a trusted relationship with the high side entity.

At (2), a proxy configuration computing service 212 (e.g., an event-driven, serverless computing platform provided by a service provider, and that runs code in response to events and automatically manages the computing resources required by that code) may be invoked by resource management. During proxy configuration, the cross-domain resource access system 102 may use the PCCS identifier 204 and the mapping identifier 206 to define a trust relationship between the PCCS identifier 204 and the mapping identifier 206, and add the same to an allowlist. y. The information generated at (2) may be referred to as proxy configuration information and may be stored in a datastore.

At (3), a guard configuration computing service 214 is invoked by the resource management. During guard configuration, the cross-domain resource access system 102 may define what guard lanes a user is eligible to have traffic routed over. In particular, guard configuration may include defining policies according to which traffic may be routed via one of the confidentiality controlled interface (e.g., "guarding devices," and any other suitable device for confidentially routing traffic). The information generated at (3) may be referred to as guard configuration information and may be stored in a datastore.

At (4), a DNS configuration service 216 utilizes the proxy and guard configuration information to generate DNS configuration information. The DNS configuration information includes DNS service record (SRV), which may define the location, e.g., a hostname and port number, of the receiving servers. The DNS SRV records enable the service provider data plane 116 to quickly route a user's request to a guard endpoint. In some examples, (4) may publish the DNS SRV to the hosted zone such as a domain, and the service provider data plane 115 may then leverage these records such that when queried by a mapping identifier and DNS address, the proxy can quickly forward the traffic to the guard DNS address. The information generated at (4) may be referred to as DNS configuration information and may be stored in a datastore.

As noted above, FIG. 2 illustrates a set of configuration operations, depicted as numerals (5)-(8), performed by the control plane 200 as part of onboarding a new user for receiving. For receiving, at (5), the user 201 provides the cross-domain resource access system 102 endpoint information (e.g., the user's application's PCCS-private IP-address and port). The user 201 may also delegate required permissions to the cross-domain resource access system 202 for creating and managing receiving interfaces (e.g., X-ENI). The cross-domain resource access system 102 onboarding process may provide the mapping identifier 206 utilized during the sending side setup (e.g., (1)-(4)) and publish the mapping identifier 206 with the endpoint information as a published event. The published event then triggers a resource management workflow 215, e.g., (6)-(8).

At (6), the a dispatch configuration service 218 is invoked. The dispatch configuration service 218 stores the relationship between a user's PCCS identifier and the service endpoint the user wishes to proxy. In some examples, this endpoint is the endpoint identified by the endpoint information at (5). The information generated at (6) may be referred to as dispatch configuration information and may be stored in a datastore.

At (7), an interface configuration service 220 is invoked. The interface configuration service 220 leverages the user's permissions delegation obtained at (5) to create a network interface (e.g., an elastic network interface such as an X-ENI) in the user's PCCS subnet that the cross-domain resource access system 102 will use as egress to reach a user's resources in the service provider data plane 116. The information generated at (7) may be referred to as interface configuration information and may be stored in a datastore.

At (8), a DNS configuration service 222 is invoked. The DNS configuration service 222 may generate DNS SRV records for the dispatcher proxy to translate requests received by confidentially controlled interface devices for final proxying and delivery to the user hosted service endpoint. In some examples, this may include publishing the DNS records to the service provider data plane 116, and the dispatcher proxy may leverage these records for delivery. The information generated at (8) may be referred to as DNS configuration information and may be stored in a datastore. In some examples, upon completion of workflows illustrated by (1)-(4) and (5)-(8), a user is fully onboarded and ready to start sending traffic over the cross-domain resource access system 102.

Figure 3:
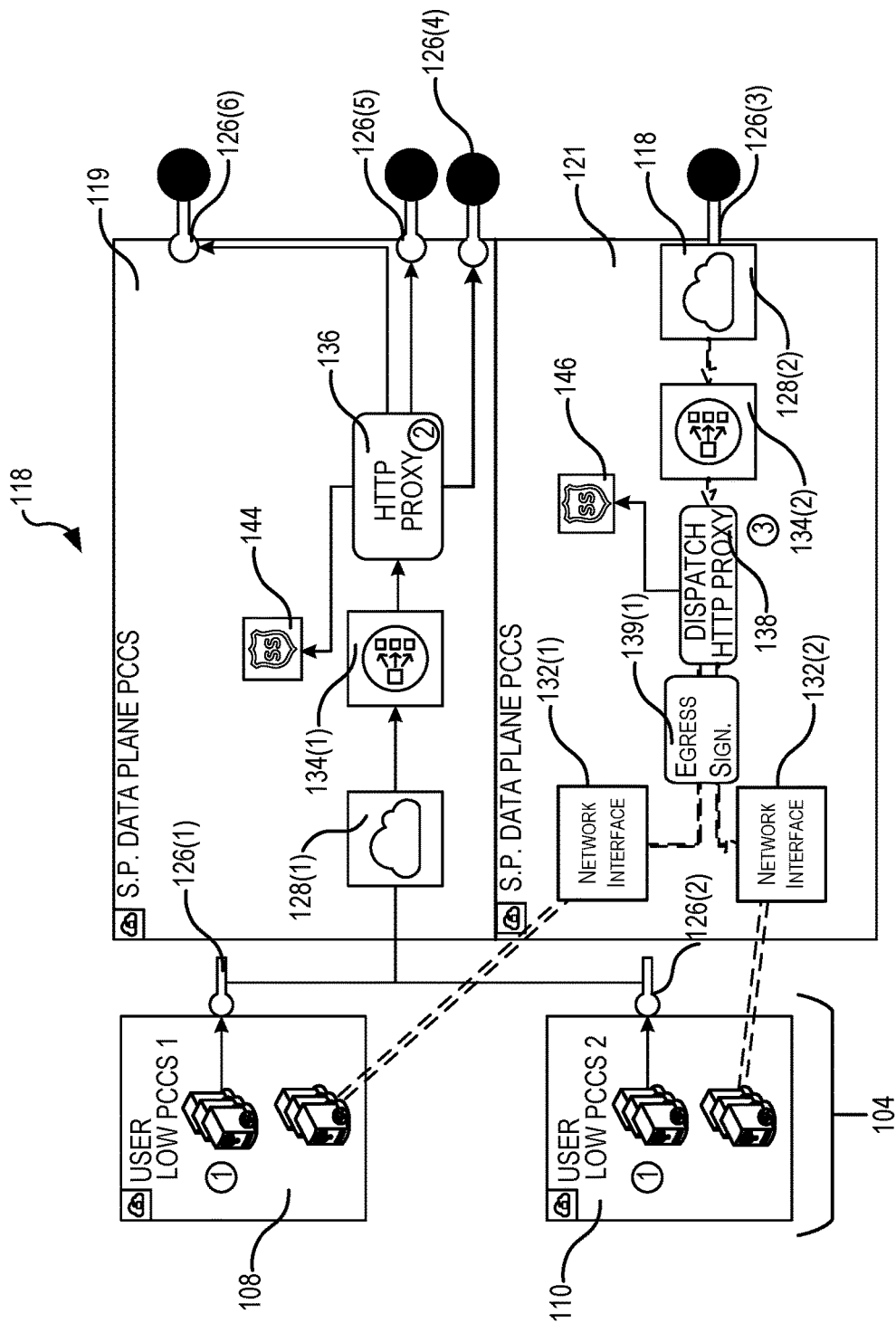
FIG. 3 illustrates an expanded view of user domains and a data plane of a cross-domain resource access system from the architecture of FIG. 1 for implementing techniques relating to low latency cross-domain resource access, according to at least one example.
Figure 4:
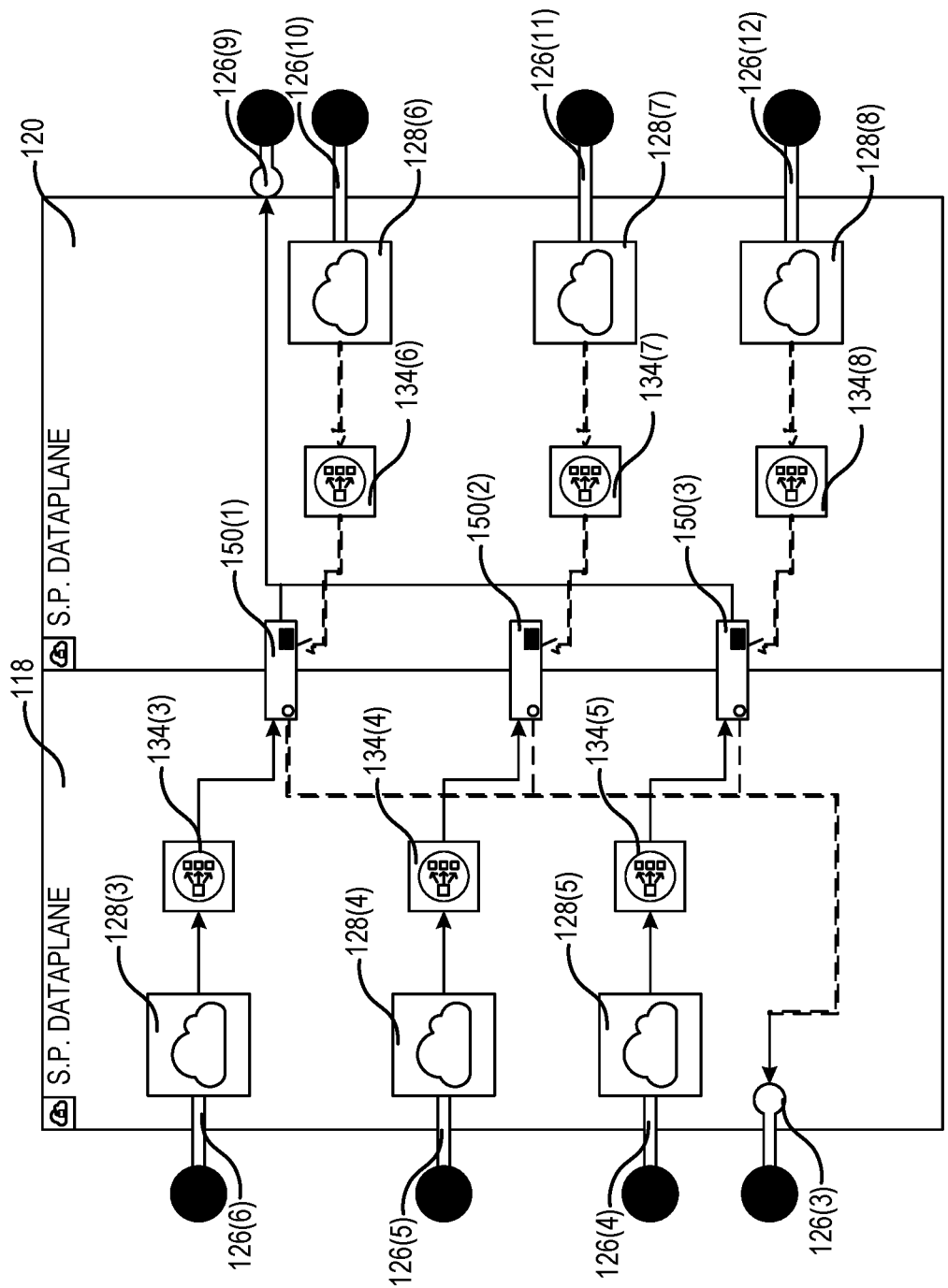
FIG. 4 illustrates an expanded view of the data plane of the cross-domain resource access system from the architecture of FIG. 1 for implementing techniques relating to low latency cross-domain resource access, according to at least one example.
Figure 5:
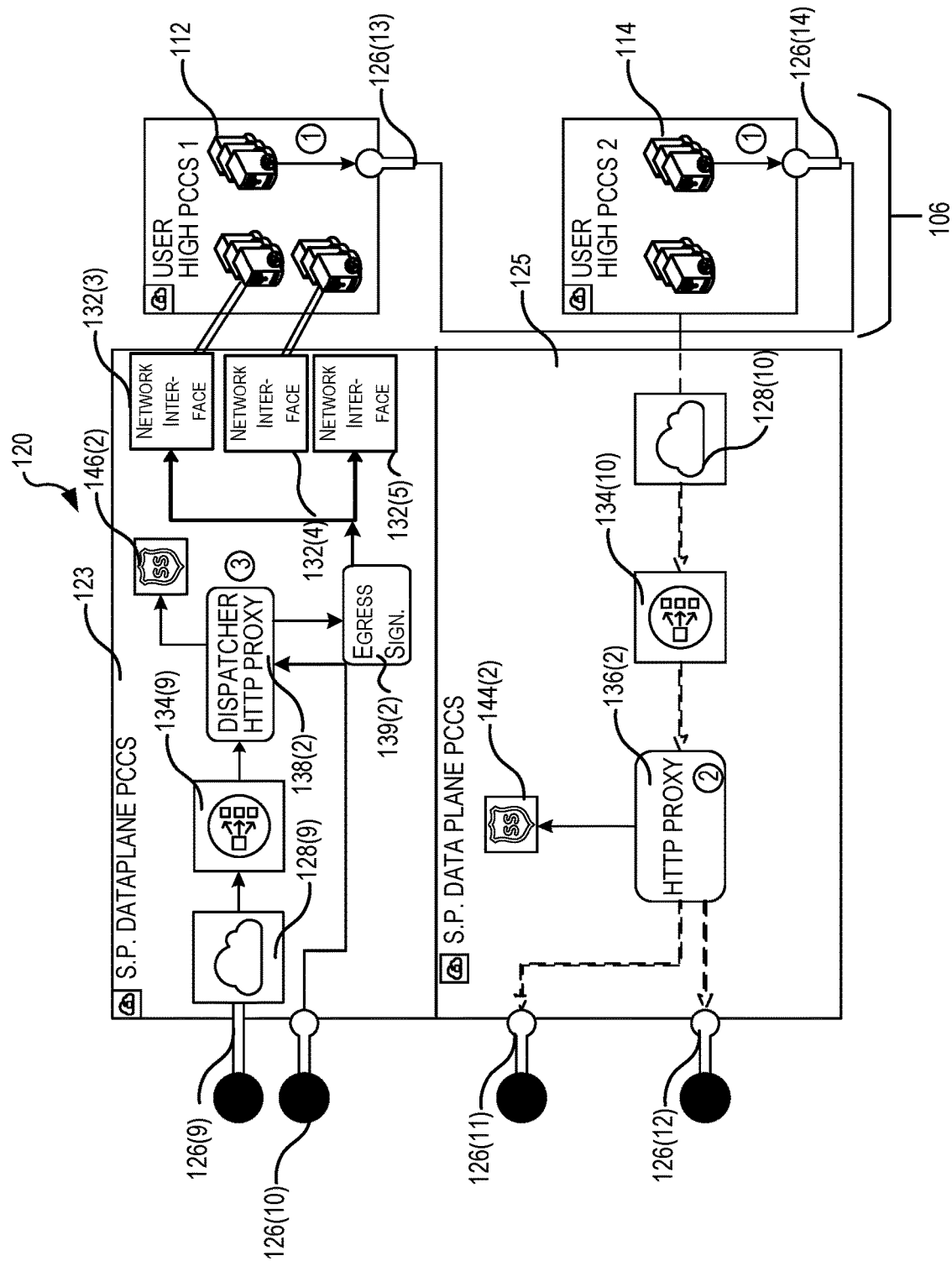
FIG. 5 illustrates an expanded view of user domains and the data plane of a cross-domain resource access system from the architecture of FIG. 1 for implementing techniques relating to low latency cross-domain resource access, according to at least one example.

FIGS. 3-5 generally depict enhanced views of the architecture 100. In particular, FIG. 3 illustrates an expanded view of low-side user domains and the first service provider data plane 118, which includes first service provider data plane PCCSs 119, 121, of the cross-domain resource access system 102 from the architecture 100 of FIG. 1, according to at least one example. FIG. 4 illustrates an expanded view of the cross-domain resource access system 102 from the architecture of FIG. 1, according to at least one example. FIG. 5 illustrates an expanded view of high-side user domains and the second service provider data plane 120, which includes second service provider data plane PCCSs 123, 125, of the cross-domain resource access system 102 from the architecture 100 of FIG. 1, according to at least one example. Encircled letters (A), (B), (C), (D), (E), (F), (G), and (H) represent continuations/connections between the various FIGS. 3-5. FIG. 3-5 also depict example requests and responses, illustrated, respectively by solid lines and dashed lines. Numerals (1) through (4) correspond to sending and receiving traffic between the user resources in the two different domains 104, 106. In some examples, the responses may be proxied using different paths than those illustrated.

Turning in particular to FIG. 3, this figure depicts the user first domain 104 (e.g., a low-side domain), which includes the two PCCSs 108 and 110. As described herein, the PCCSs 108 and 110 enable the resources (e.g., applications, services, data, etc.) that are the subject of this specification. Each PCCS 108 and 110 includes at least one PCCS endpoint 126(1) and 126(2). A PCCS endpoint 126 is a connection between the respective PCCS and the service provider data plane 118 via an endpoint mapping service.

FIG. 3 also illustrates additional elements of the service provider data plane 118. In particular, the service provider data plane 118 may include the service provider data plane PCCSs 119 and 121. The service provider data plane PCCS 119 may include the private network link 128(1), a network load balancer 134(1), a HTTP proxy 136, and a guard proxy configuration cache 144. The service provider data plane PCCS 121 may include network interfaces 132 (e.g., virtual network interfaces provided by one or more virtual computing instances), dispatch HTTP proxy 138, network load balancer 134(2), s delivery proxy cache 146, and private network link 128(1). As may be evident from FIG. 3, the private network link 128(1), the network load balancer 134, and the HTTP proxy 136 may be used for messages flowing from the user domain 104 to the user domain 106, via the service provider data plane PCCS 119. Similarly, the network interfaces 132, the dispatch HTTP proxy 138, the network load balancer 134(2), and a private network link 142 may be used for messages flowing from the user domain 106 to the user domain 104, via the service provider data plane PCCS 121. As shown in FIG. 5, the second service provider data plane 120 may include similar elements, distributed between similar service provider data plane PCCSs.

As shown in FIG. 4, the private network link 142 and endpoint 126(2) are connected to one or more confidentiality controlled interfaces. The remaining endpoints 126(3)-126(6) are connected to corresponding private network links illustrated in FIG. 4.

FIG. 3 also illustrates the guard proxy configuration cache 144 and the delivery proxy cache 146. The guard proxy configuration cache 144 is used to store the information generated during the sending workflow (e.g., (1)-(4) of FIG. 2). This may include, for example, the proxy configuration information, guard configuration information, and DNS configuration information. The delivery proxy cache 146 is used to store the information generated during the receiving workflow (e.g., (5)-(8) of FIG. 2). This may include, for example, dispatch configuration information, interface configuration information, and DNS configuration information. The caches 144, 146 may be implemented using any suitable approach for data storage including, for example, a database, datastore, etc.

The set of operations of FIGS. 3-5 begin at (1) by a user issuing a request (e.g., an HTTP request) to the PCCS endpoint 126(1). The request may include the mapping identifier discussed with reference to FIG. 2 included therewith (e.g., as part of a reserved header of the request, within the body of the message, etc.). The request may come from any one of the PCCSs (e.g., 108 or 110). From the PCCS endpoint 126(1) or 126(2), the request is directed to the private network link 128, then to the network load balancer 134(1), and then to the HTTP proxy 136. In some examples, the request may be signed.

At (2), the HTTP proxy 136 accesses the guard proxy configuration cache 144 to obtain information about routing the request to the appropriate guarding device. In particular, the HTTP proxy 136 may read the mapping identifier from the header of the HTTP request, and use the mapping identifier as an index to access the stored allowedlist of PCCS identifier 204 received via the private network link 128(1). Using other information stored in the guard proxy configuration cache 144 (e.g., the guard configuration information) and the mapping identifier, the HTTP proxy 136 determines the appropriate confidentiality controlled interface (e.g., virtualized interface, guarding device, etc.) and guard configuration (e.g., a set of filtering rules and/or schema defining what types of information may be passed over the confidentially controlled interface devices).

As shown in FIG. 4 a portion of the first service provider data plane 118 includes connections between endpoints 126 and private network links 128(3)-128(5) of the first service provider data plane 118. A portion of the second service provider data plane 120 also includes private network links 128(6)-128(8) connected to endpoints 126(10)-126(12). The endpoints 126(3) and 126(9) are each connected to one of the confidentiality controlled interfaces 150(1)-150(3). The confidentiality controlled interfaces 150 may include guarding devices, virtualized interfaces, and the like configured to enable high throughput and low latency transmission with the ability to provide cross-domain policy filtering. In particular, the confidentiality controlled interfaces 150 may provide Layer 3 and Layer 7 protection and include features such as auto-shutdown if nefarious actions are detected, advanced routing based on user policies or other schema, policy, and the like. The confidentiality controlled interfaces 150 are configured to transfer requests from different users using the same channel and same HTTP proxy. This is because, rather than dedicating channels to a user, the confidentiality controlled interfaces 150 use Layer 7 trust relationship principles to ensure security and reliability of data transfer.

In some examples, the techniques described herein may be implemented across entirely within a private network, even when elements of the network are distributed throughout a geographic region. For example, the confidentiality controlled interfaces 150 may be located within a particular region (e.g., along the Eastern seaboard of the United States) and the user's PCCSs 108, 110, 112, and 114 may be located in one or more different regions of the United States (e.g., along the Western seaboard of the United States). In this example, the cross-domain resource access system 102 may provide point-of-presence (PoPs) in regions where the confidentiality controlled interfaces 150 are not located. These PoPs may be used as access points for routing network traffic using the private network of the service provider, even when the confidentiality controlled interfaces 150 and user's PCCSs are not located within the same datacenter, same region, or the like.

As noted above, FIG. 5 illustrates essentially the same elements as shown in FIG. 3. Thus, the service provider second data plane 120 includes service provider second data plane PCCSs 123 and 125. In the service provider second data plane PCCS 123 is included the endpoint 126(9) connected to private link 128(9), and private link 128(9) connected to load balancer 134(9), and load balancer 134(9) connected to dispatcher HTTP proxy 138(2). Prior to the data arriving at the network interfaces 132 as proxied from the dispatcher HTTP proxy 138(2), a egress signing service 139(2) cryptographically signs requests to enable the end-user to verify that the request came from (and was not altered) during transmission via the cross-domain resource access system 102. The egress signing service 139(2) may use any suitable cryptographic signing method to enable verification by the end users. Similarly, the endpoints 126(11)-126(12) are connected to HTTP proxy 136(2), which is connected to load balancer 134(1), which is connected to private link 128(10), which is connected to the PCCS 114. The PCCS 112 and 114 may be connected via endpoints 126(13) and 126(14).

At (3), the dispatch HTTP proxy 138 receives the HTTP request from the confidentiality controlled interface 150 and proxies the request to the network interface 132 (inside of the first service provider data plane 120) associated with the customer's mapping. The network interface 132 directs the inbound traffic to the mapping's configured destination IP address inside of the user's PCCS (e.g., the PCCS 112).

Figure 6:
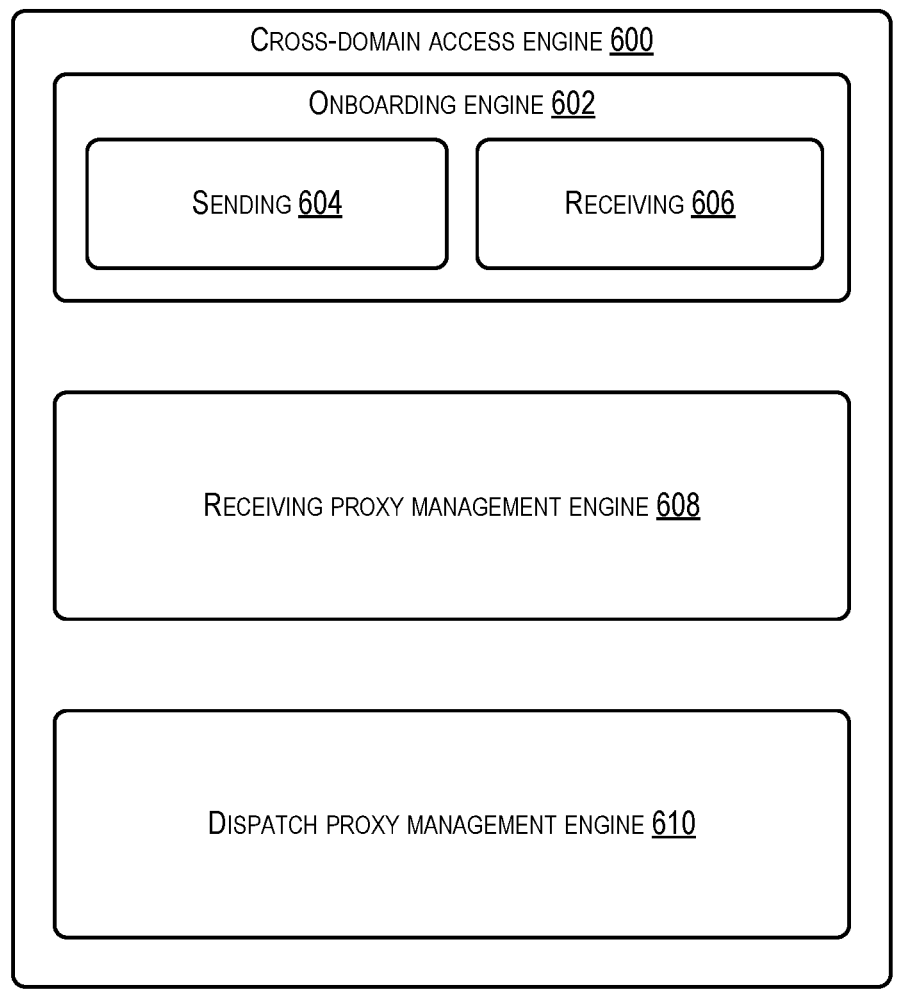
FIG. 6 illustrates an example cross-domain resource access engine for implementing techniques relating to low latency cross-domain resource access, according to at least one example.

FIG. 6 illustrates an example cross-domain resource access engine 600 for implementing techniques relating to low latency cross-domain resource access, according to at least one example. Generally, the cross-domain resource access engine 600 may be configured to performs the techniques described herein. The cross-domain resource access engine 600 may be implemented using one or more computing devices such as different virtual computers, operating at different locations. The cross-domain resource access engine 600 may include an onboarding engine 602, a receiving proxy management engine 608, and a dispatch proxy management engine 610. In some examples, the engines may be implemented in hardware such as using one or more dedicated processors, as software, as firmware, and/or as any combination of the foregoing.

Generally, the onboarding engine 602 may be configured to perform the onboarding operations described herein, such as illustrated and described with respect to FIG. 2. Thus, the onboarding engine 602 may include a sending module 604 and a receiving module 606. The sending module 604 may be configured to collect the necessary data from the user in order generate the various types of configuration information described herein and used for sending. The receiving module 606 may be configured to collect the necessary data from the user in order generate the various types of configuration information described herein and used for receiving.

The receiving proxy management engine 608 may be configured to receive requests from users in various first domains and proxy those requests to the confidentially controlled interface devices, as described with respect to FIG. 4.

The dispatch proxy management engine 610 may be configured to receive requests from the confidentially controlled interface devices and proxy those requests to various different second domains.

Figure 7:
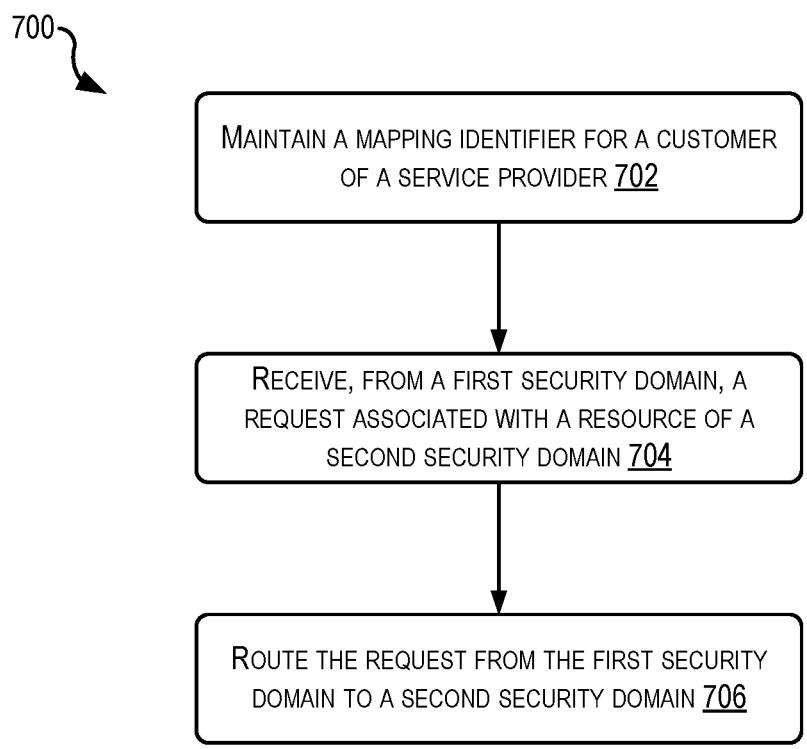
FIG. 7 illustrates an example flow diagram depicting a process for implementing techniques relating to low latency cross-domain resource access, according to at least one example.
Figure 8:
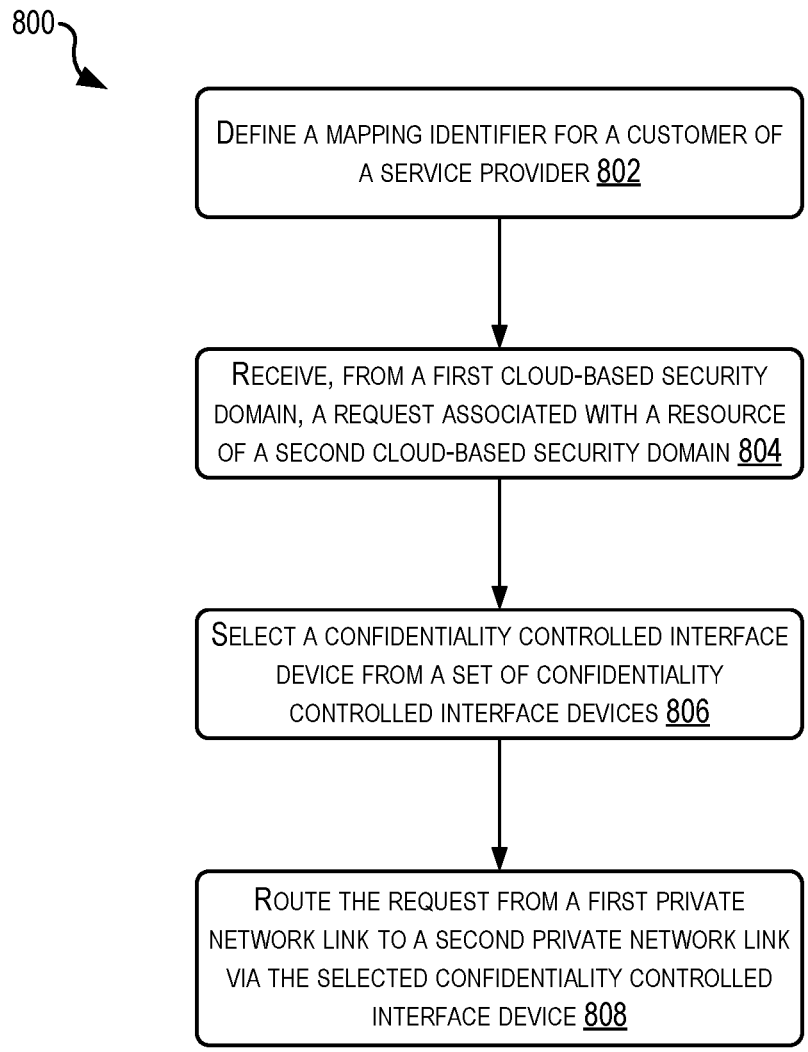
FIG. 8 illustrates an example flow diagram depicting a process for implementing techniques relating to low latency cross-domain resource access, according to at least one example.
Figure 9:
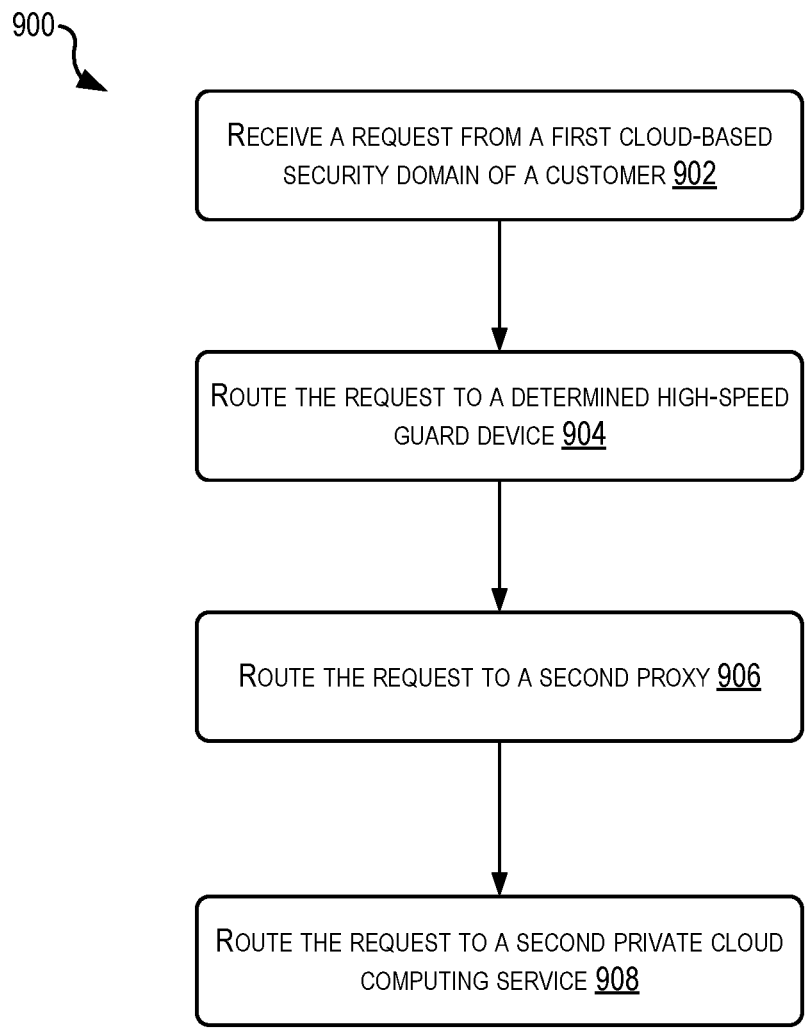

FIGS. 7, 8, and 9 illustrate example flow diagrams showing processes 700, 800, and 900, as described herein. The processes 700, 800, and 900 are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement the processes.

Additionally, some, any, or all of the processes may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable storage medium, for example, in the form of a computer program comprising a plurality of instructions executable by one or more processors. The computer-readable storage medium is non-transitory.

FIG. 7 illustrates an example flow diagram depicting a process 700 for implementing techniques relating to low latency cross-domain resource access, according to at least one example. The cross-domain resource access engine 600 may perform the process 700.

The process 700 begins at block 702 by maintaining a mapping identifier for a user of a service provider. The mapping identifier may generated based on user information (e.g., an account number of the user, domain identifiers of the first and/or second domain, a pin generated and shared out-of-band, and any other suitable information associated with the user and/or the user's domains). The service provider may be configured to provide multiple security domains for the user within a cloud computing environment. For example, the user may have first and second security domains. The security domains may be cloud-based. The mapping identifier may be associated with an endpoint of a private cloud computing service (PCCS) of the first security domain. In some examples, the first and second security domains have different levels of security classification or different levels of security categories. For example, one security domain may have a high classification level while the other may have a low classification level. The techniques described herein provide a secure and trusted way of resource access across domains like these that have different classification levels. In some examples, the request may be associated with put-up functionality and the first security domain may be lower than the second security domain. In some examples, the request may be associated with browse-down functionality and the first security domain may be higher than the second security domain.

At block 704, the process 700 includes receiving, from the first security domain, a request associated with a resource of the second security domain. The request may include the mapping identifier. The request may be issued by a resource of the first security domain. The request may be an HTTP request or any other suitable defined request. The request may be a request to use the resource of the second security domain. The resource may be a user-specific application or user-specific service. For example, the resource may be a custom-built application or service created by the user. In this manner, the resource may be specific to the needs of the user. The approaches described herein are agnostic to the resource being accessed, so long as the request can be issued and proxied using a predefined protocol such as HTTP, and the user can access any resource within a different domain. In some examples, this may include transferring files, accessing data, accessing and utilizing applications and services, and the like. In some examples, the resource may be a generic application offered by the service provider to other users or a generic service offered by the service provider to other users. For example, the service provider may offer users a set of predefined services and applications that can be used in the cloud-based computing environment. The techniques described herein enable cross-domain resource access of these resources as well as the custom-built resources described previously.

At block 706, the process 700 includes routing the request from the first security domain to the second security domain. This may include routing the request via a first private network link of the first security domain and a second private network link of the second security domain using a confidentiality controlled interface. For example, the private network links may provide a pathway between the two security domains that stays private with respect to the user and the service provider. In some examples, the private network links may be provided by the cross-domain resource access system. In some examples, the routing at block 706 may be performed without using public network resources. For example, the request may be routed between domains without traversing the Internet, even when the hardware resources with each domain may be located in different geographic areas.

In some examples, routing the request from the first security domain to the second security domain at block 706 may include an egress routine for transmitting the request from the confidentiality controlled interface to the second security domain. The egress routine may include receiving, by an egress proxy, the request from the second private network link. The egress proxy may also be referred to as a dispatch proxy. The egress routine may also include routing, by the egress proxy, the request to a first private cloud computing service operated by and associated with the service provider. The egress routine may also include determining, using the mapping identifier, a destination network address associated with a second private cloud computing service operated by and associated with the user. The destination network address may be a universal resource locator, which may be identified using a DNS SRV that defines a relationship between the mapping identifier and the network address (e.g., a user endpoint). In some examples, this may be based on the DNS configuration information. The egress routing may also include routing, by the first private cloud computing service, the request to the second private cloud computing service using the destination network address.

In some examples, routing the request via the confidentiality controlled interface may include selecting an appropriate confidentiality controlled interface using guard configuration information (e.g., a mapping between the an identifier of the user's private cloud computing service and an identifier for the confidentiality controlled interface). Routing may also include the confidentiality controlled interface applying one or more filters to the request. This may include determining whether the request is approved for release to the second security domain. In some examples, the confidentiality controlled interface may include a guarding device. In some examples, confidentiality controlled interface is configured to enforce a schema associated with the user.

FIG. 8 illustrates an example flow diagram depicting a process 800 for implementing techniques relating to low latency cross-domain resource access, according to at least one example. The cross-domain resource access engine 600 may perform the process 800.

The process 800 begins at block 802 by defining a mapping identifier for a user of a service provider. The mapping identifier may be based on user information. The service provider may provide first and second cloud-based security domains for the user. The first and second cloud-based security domains may have different levels of security classification or different security categories. Defining the mapping identifier may be performed as part of an onboarding sending workflow. This may be performed by a service of the cross-domain resource access system.

At block 804, the process 800 includes receiving, from the first cloud-based security domain, a request associated with a resource of the second cloud-based security domain. Block 802 may be performed similarly to block 702. Thus, the request may include the mapping identifier. In some examples, receiving the request may include receiving the request from an endpoint of a private cloud computing service located within the first cloud-based security domain.

At block 806, the process 800 includes selecting a confidentiality controlled interface from a set of confidentiality controlled interfaces based on the mapping identifier. Selecting the confidentiality controlled interface based on the mapping identifier may include using the mapping identifier as a key value for accessing guard configuration information in a proxy configuration cache. The guard configuration information may identify (e.g., by a unique address and/or identifier) the appropriate confidentiality controlled interface for the user's traffic and a configuration for the same. The configuration may include a set of policy, schema, or the like relating to the traffic that may flow across and/or may not flow across the confidentiality controlled interface. The set of confidentiality controlled interface may be configured to control data flow between a plurality of cloud-based security domains including the first and second cloud-based security domains and other cloud-based security domains associated with different users. The confidentiality controlled interfaces may define the boundaries between the two domains and may be used by multiple different users.

At block 808, the process 800 includes routing the request from a first private network link of the first security domain to a second private link of the second security domain via the selected confidentiality controlled interface. In some examples, the process 800 may include determining a set of policy filters for the selected confidentiality controlled interface based on the mapping identifier. The routing may be performed via the selected confidentiality controlled interface using the set of policy filters.

In some examples, routing the request from the first private network link to the second private link via the selected confidentiality controlled interface may include determining that the user is authorized to access the second cloud-based security domain based on a comparison of the mapping identifier with an allowlist that identifies a virtual private connection identifier of the first cloud-based security domain, causing transmission of the request from the first private network link to the selected confidentiality controlled interface, causing transmission of the request from the selected confidentiality controlled interface to the second private link, and proxying the request to an endpoint of a private cloud computing service located within the second cloud-based security domain.

FIG. 9 illustrates an example flow diagram depicting a process 900 for implementing techniques relating to low latency cross-domain resource access, according to at least one example. The cross-domain resource access engine 600 may perform the process 900.

The process 900 begins at block 902 by receiving a request from a first cloud-based security domain of a user. In some examples, the request is received at a first proxy and via a first private network link. The request may include mapping information and may be associated with a second cloud-based security domain of the user. In some examples, the request may be associated with at least one of a service of the second cloud-based security domain, an application of the second cloud-based security domain, one-directional data transfer to or from the second cloud-based security domain, or two-directional data transfer between the first cloud-based security domain and the second cloud-based security domain.

At block 904, the process 900 includes routing the request to a determined guarding device. This may include routing the request via a second private network link.

At block 906, the process 900 includes routing the request to a second proxy. This may include routing the request from the guarding device and via a third private network link.

At block 908, the process 900 includes routing the request to a second private cloud computing service operated by and associated with the user. This may include routing from the second proxy and via a first private cloud computing service operated by and associated with the service provider. In some examples, routing the request to the second private cloud computing service may be based on the mapping information and delivery proxy configuration information.

In some examples, the process 900 may further include determining the guarding device for handling the request based on guard proxy configuration information and the mapping information.

Figure 10:
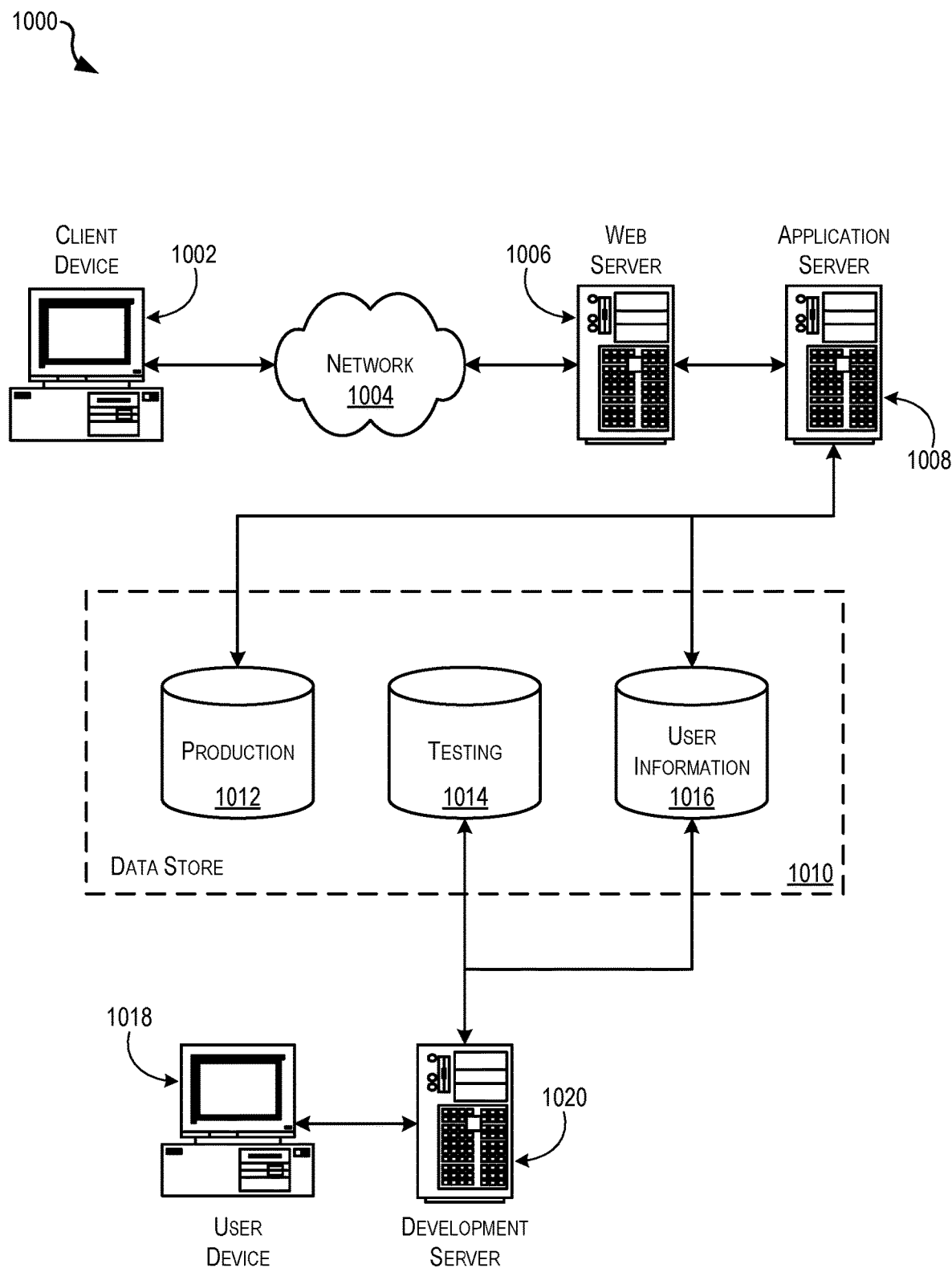
FIG. 10 illustrates an environment in which various examples can be implemented.

FIG. 10 illustrates aspects of an example environment 1000 for implementing aspects in accordance with various examples. As will be appreciated, although a Web-based environment may be utilized for purposes of explanation, different environments may be utilized, as appropriate, to implement various embodiments. The environment 1000 shown includes both a testing or a development portion (or side) and a production portion. The production portion includes an electronic client device 1002, which may include any appropriate device operable to send and receive requests, messages, or information over an appropriate network 1004 and convey information back to a user of the device 1002. Examples of such client devices include personal computers, cell phones, handheld messaging devices, laptop computers, tablet computers, set-top boxes, personal data assistants, electronic book readers, and the like.

The network 1004 may include any appropriate network, including an intranet, the Internet, a cellular network, a local area network, a wide area network, a wireless data network, or any other such network or combination thereof. Components utilized for such a system may depend at least in part upon the type of network and/or environment selected. Protocols and components for communicating via such a network are well known and will not be discussed herein in detail. Communication over the network may be enabled by wired or wireless connections, and combinations thereof. In this example, the network 1004 includes the Internet, as the environment includes a Web server 1006 for receiving requests and serving content in response thereto, although for other networks an alternative device serving a similar purpose could be utilized as would be apparent to one of ordinary skill in the art.

The illustrative environment 1000 includes at least one application server 1008 and a data store 1010. It should be understood that there may be several application servers, layers, or other elements, processes, or components, which may be chained or otherwise configured, which may interact to perform tasks such as obtaining data from an appropriate data store. As used herein the term "data store" refers to any device or combination of devices capable of storing, accessing, and/or retrieving data, which may include any combination and number of data servers, databases, data storage devices, and data storage media, in any standard, distributed, or clustered environment.

The application server 1008 may include any appropriate hardware and software for integrating with the data store as needed to execute aspects of one or more applications for the client device 1002, and may even handle a majority of the data access and business logic for an application. The application server 1008 provides access control services in cooperation with the data store 1010, and is able to generate content such as text, graphics, audio, and/or video to be transferred to the user, which may be served to the user by the Web server 1006 in the form of HTML, XML, or another appropriate structured language in this example.

The handling of all requests and responses, as well as the delivery of content between the client device 1002 and the application server 1008, may be handled by the Web server 1006. It should be understood that the Web and application servers 1006, 1008 are not required and are merely example components, as structured code discussed herein may be executed on any appropriate device or host machine as discussed elsewhere herein. Further, the environment 1000 may be architected in such a way that a test automation framework may be provided as a service to which a user or application may subscribe. A test automation framework may be provided as an implementation of any of the various testing patterns discussed herein, although various other implementations may be utilized as well, as discussed or suggested herein.

The environment 1000 may also include a development and/or testing side, which includes a user device 1018 allowing a user such as a developer, data administrator, or tester to access the system. The user device 1018 may be any appropriate device or machine, such as is described above with respect to the client device 1002. The environment 1000 may also include a development server 1020, which functions similar to the application server 1008 but typically runs code during development and testing before the code is deployed and executed on the production side and becomes accessible to outside users, for example. In some embodiments, an application server may function as a development server, and separate production and testing storage may not be utilized.

The data store 1010 may include several separate data tables, databases, or other data storage mechanisms and media for storing data relating to a particular aspect. For example, the data store 1010 illustrated includes mechanisms for storing production data 1012 and user information 1016, which may be utilized to serve content for the production side. The data store 1010 also is shown to include a mechanism for storing testing data 1014, which may be utilized with the user information for the testing side. It should be understood that there may be many other aspects that are stored in the data store 1010, such as for page image information and access right information, which may be stored in any of the above listed mechanisms as appropriate or in additional mechanisms in the data store 1010.

The data store 1010 is operable, through logic associated therewith, to receive instructions from the application server 1008 or development server 1020, and obtain, update, or otherwise process data in response thereto. In one example, a user might submit a search request for a certain type of item. In this case, the data store 1010 might access the user information 1016 to verify the identity of the user, and may access the catalog detail information to obtain information about items of that type. The information then may be returned to the user, such as in a results listing on a Web page that the user is able to view via a browser on the user device 1002. Information for a particular item of interest may be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment 1000 in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the environment 1000 in FIG. 10 should be taken as being illustrative in nature, and not limiting to the scope of the disclosure. In at least one embodiment, one or more aspects of the environment 1000 may incorporate and/or be incorporated into a virtual resource provisioning architecture.

The various examples further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most examples utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In examples utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of examples, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate examples may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various examples.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated examples thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed examples (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate examples of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain examples require at least one of X, at least one of Y, or at least one of Z to each be present.

Various examples of this disclosure are described herein, including the best mode known to the inventors for carrying out the disclosure. Variations of those various examples may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. One or more non-transitory computer-readable media comprising computer-executable instructions that, when executed by one or more computer systems, cause the one or more computer systems to perform operations comprising:
   defining a mapping identifier for a user of a service provider based on user information, the service provider providing first and second cloud-based security domains for the user, wherein the first and second cloud-based security domains have different levels of security classification or different levels of security categories;
   receiving, from the first cloud-based security domain, a request associated with a resource of the second cloud-based security domain, the request comprising the mapping identifier;
   selecting a confidentiality controlled interface from a set of confidentiality controlled interfaces based on the mapping identifier, the set of confidentiality controlled interfaces configured to control data flow between a plurality of cloud-based security domains comprising the first and second cloud-based security domains and other cloud-based security domains associated with different users; and
   routing the request from a first private network link of the first cloud-based security domain to a second private network link of the second cloud-based security domain via the selected confidentiality controlled interface.

2. The one or more non-transitory computer-readable media of claim 1, the operations further comprising determining a set of policy filters for the selected confidentiality controlled interface based on the mapping identifier, wherein the routing is performed via the selected confidentiality controlled interface using the set of policy filters.

3. The one or more non-transitory computer-readable media of claim 1, wherein routing the request from the first private network link to the second private network link via the selected confidentiality controlled interface comprises:
- determining that the user is authorized to access the second cloud-based security domain based on a comparison of the mapping identifier with an allowlist that identifies a virtual private connection identifier of the first cloud-based security domain;
- causing transmission of the request from the first private network link to the selected confidentiality controlled interface;
- causing transmission of the request from the selected confidentiality controlled interface to the second private network link; and
- proxying the request to an endpoint of a private cloud computing service located within the second cloud-based security domain.

4. The one or more non-transitory computer-readable media of claim 1, wherein receiving the request comprises receiving the request from an endpoint of a private cloud computing service located within the first cloud-based security domain.

5. The one or more non-transitory computer-readable media of claim 1, wherein selecting the confidentiality controlled interface from the set of confidentiality controlled interfaces is further based on configuration information stored in a proxy configuration cache associated with the first cloud-based security domain.

6. A computer-implemented method, comprising:
- maintaining a mapping identifier for a user of a service provider based on user information, the service provider providing first and second security domains for the user, the mapping identifier associated with an endpoint of a private cloud computing service of the first security domain;
- receiving, from the first security domain, a request associated with a resource of the second security domain, the request comprising the mapping identifier; and
- routing the request from the first security domain to the second security domain via a first private network link of the first security domain and a second private network link of the second security domain using a confidentiality controlled interface.

7. The computer-implemented method of claim 6, wherein the request comprises a hypertext transfer protocol (HTTP) request that includes the mapping identifier in a header of the HTTP request or in a body of the HTTP request.

8. The computer-implemented method of claim 6, wherein the resource comprises a user-specific application or a user-specific service.

9. The computer-implemented method of claim 6, wherein the resource comprises a generic application offered by the service provider to other users or a generic service offered by the service provider to the other users.

10. The computer-implemented method of claim 6, wherein the first and second security domains have different levels of security classification or different levels of security categories.

11. The computer-implemented method of claim 6, wherein routing the request comprises routing the request without using public network resources.

12. The computer-implemented method of claim 6, wherein routing the request from the first security domain to the second security domain comprises an egress routine for transmitting the request from the confidentiality controlled interface to the second security domain, the egress routine comprising:
- receiving, by an egress proxy, the request from the second private network link;
- routing, by the egress proxy, the request to a first private cloud computing service operated by and associated with the service provider;
- determining, using the mapping identifier, a destination network address associated with a second private cloud computing service operated by and associated with the user; and
- routing, by the first private cloud computing service, the request to the second private cloud computing service using the destination network address.

13. The computer-implemented method of claim 6, wherein the request is associated with put-up functionality and the first security domain is lower than the second security domain.

14. The computer-implemented method of claim 6, wherein the request is associated with browse-down functionality and the first security domain is higher than the second security domain.

15. The computer-implemented method of claim 6, wherein the confidentiality controlled interface comprises a guarding device.

16. The computer-implemented method of claim 6, wherein the confidentiality controlled interface is configured to enforce a schema associated with the user.

17. A computer-implemented method, comprising:
- receiving, at a first proxy and via a first private network link, a request from a first cloud-based security domain of a user of a service provider, the request comprising mapping information and being associated with a second cloud-based security domain of the user;
- routing, via a second private network link, the request to a determined guarding device;
- routing, from the guarding device and via a third private network link, the request to a second proxy; and
- routing, from the second proxy and via a first private cloud computing service operated by and associated with the service provider, the request to a second private cloud computing service operated by and associated with the user.

18. The computer-implemented method of claim 17, further comprising determining the guarding device for handling the request based on guard proxy configuration information and the mapping information.

19. The computer-implemented method of claim 17, wherein routing the request to the second private cloud computing service is based on the mapping information and delivery proxy configuration information.

20. The computer-implemented method of claim 17, wherein the request is associated with at least one of a service of the second cloud-based security domain, an application of the second cloud-based security domain, one-directional data transfer to or from the second cloud-based security domain, or two-directional data transfer between the first cloud-based security domain and the second cloud-based security domain.

* * * * *